(12) United States Patent
Linn et al.

(10) Patent No.: US 11,782,297 B2
(45) Date of Patent: Oct. 10, 2023

(54) DIMPLED CONTACT LENS

(71) Applicant: CooperVision International Limited, Fareham (GB)

(72) Inventors: Matthew S. Linn, Castro Valley, CA (US); Sourav Saha, Pleasanton, CA (US); Lu Jiang, Pleasanton, CA (US); Tim Warren, Dublin, CA (US); Nancy J. Keir, Pleasanton, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 231 days.

(21) Appl. No.: 17/389,715

(22) Filed: Jul. 30, 2021

(65) Prior Publication Data
US 2022/0066238 A1 Mar. 3, 2022

Related U.S. Application Data

(60) Provisional application No. 63/071,384, filed on Aug. 28, 2020.

(51) Int. Cl.
*G02C 7/04* (2006.01)
*B29D 11/00* (2006.01)

(52) U.S. Cl.
CPC ............. *G02C 7/049* (2013.01); *G02C 7/047* (2013.01); *B29D 11/00067* (2013.01); *B29D 11/00134* (2013.01)

(58) Field of Classification Search
CPC ................................ G02C 7/049; G02C 7/047
USPC .................................................... 351/159.02
See application file for complete search history.

(56) References Cited

U.S. PATENT DOCUMENTS

| | | |
|---|---|---|
| 6,176,580 B1 | 1/2001 | Roffman et al. |
| 6,779,888 B2 | 8/2004 | Marmo |
| 6,867,245 B2 | 3/2005 | Iwata et al. |
| 7,426,993 B2 | 9/2008 | Coldrey et al. |
| 8,231,218 B2 | 7/2012 | Hong et al. |
| 8,658,747 B2 | 2/2014 | Liu et al. |
| 8,672,476 B2 | 3/2014 | Roffman et al. |
| 8,865,789 B2 | 10/2014 | Yao et al. |
| 9,389,434 B2 | 7/2016 | Jubin et al. |
| 2005/0146679 A1 | 7/2005 | Marmo et al. |
| 2008/0102151 A1 | 5/2008 | Perez et al. |

(Continued)

FOREIGN PATENT DOCUMENTS

| | | |
|---|---|---|
| CN | 204203568 U | 3/2015 |
| EP | 0734964 B1 | 12/2001 |

(Continued)

OTHER PUBLICATIONS

PCT Demand filed Apr. 21, 2022 in corresponding International Patent Application No. PCT/GB2021/052202 (23 pages).

(Continued)

*Primary Examiner* — James R Greece
(74) *Attorney, Agent, or Firm* — Kilyk & Bowersox, P.L.L.C.

(57) ABSTRACT

A contact lens having dimples on a posterior surface is described as well as cast molds and injection molding inserts for manufacturing the same. The contact lens includes a posterior surface having an optic zone, a peripheral zone, and a circumferential edge, where dimples are located in the peripheral zone, and can include at least 1000 dimples.

34 Claims, 5 Drawing Sheets

(56) References Cited

U.S. PATENT DOCUMENTS

| | | | |
|---|---|---|---|
| 2009/0303432 A1* | 12/2009 | Suzuki | B29D 11/0049 |
| | | | 351/159.02 |
| 2010/0118262 A1 | 5/2010 | Rosenthal | |
| 2011/0085128 A1 | 4/2011 | Liu et al. | |
| 2012/0242950 A1 | 9/2012 | Roffman et al. | |

FOREIGN PATENT DOCUMENTS

| | | |
|---|---|---|
| JP | 2013506875 A | 2/2013 |
| TW | 523618 B | 3/2003 |
| TW | I449614 B | 8/2014 |

OTHER PUBLICATIONS

Second Written Opinion issued in corresponding International Patent Application No. PCT/GB2021/052202 dated May 23, 2022 (7 pages).

Response to Second Written Opinion filed Jul. 21, 2022 in corresponding International Patent Application No. PCT/GB2021/052202 (5 pages).

International Preliminary Report on Patentability issued in corresponding International Patent Application No. PCT/GB2021/052202 dated Dec. 5, 2022 (14 pages).

International Search Report and Written Opinion issued in corresponding International Patent Application No. PCT/GB2021/052202 dated Dec. 2, 2021 (21 pages).

Young, "Evaluation of Soft Contact Lens Fitting Characteristics," 1996, Optometry & Vision Science, vol. 73, No. 4, pp. 247-254.

Nichols et al., "Thickness of the Pre- and Post-Contact Lens Tear Film Measured In Vivo by Interferometry," Investigative Ophthalmology & Visual Science, Jan. 2003, vol. 44, No. 1, pp. 68-77.

Office Action issued in corresponding Taiwan Patent Application No. 110130266 dated Jul. 20, 2022 (with English translation)(26 pages).

Office Action issued in corresponding Japanese Patent Application 2023-506308 dated Jul. 13, 2023 (with English translation)(8 pages).

* cited by examiner

FIG. 3
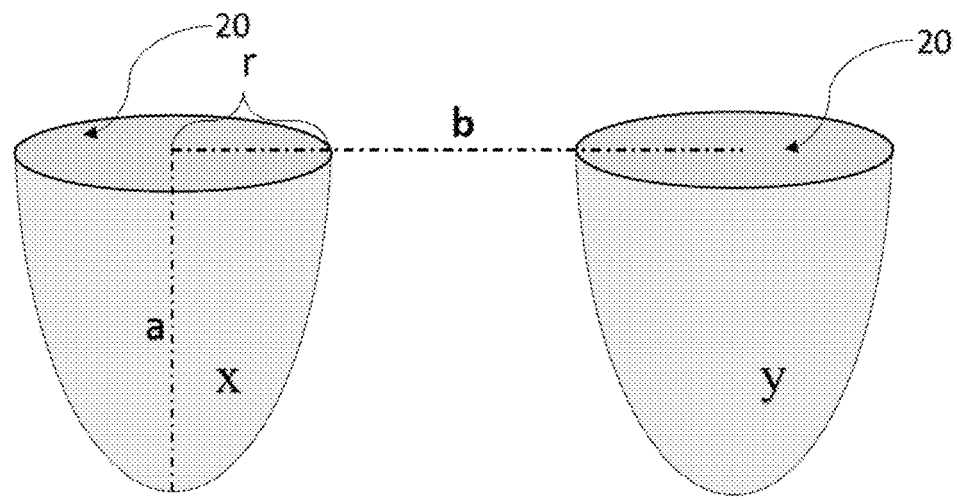
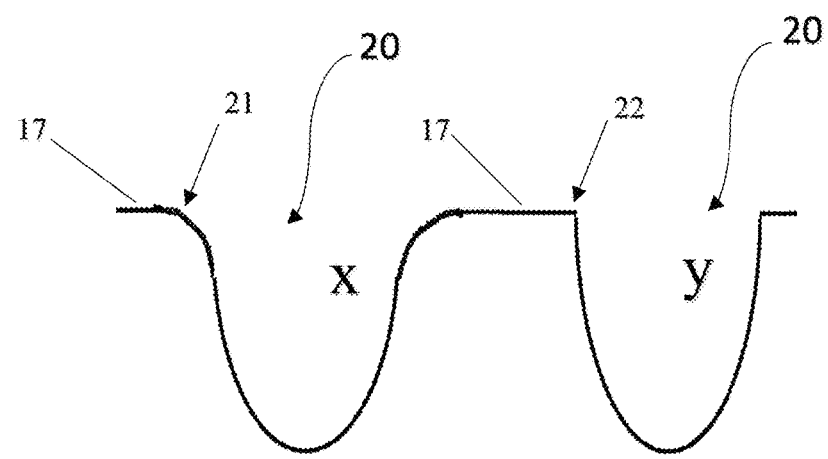
FIG. 4

DIMPLED CONTACT LENS

This application claims the benefit under 35 U.S.C. § 119(e) of prior U.S. Provisional Patent Application No. 63/071,384, filed Aug. 28, 2020, which is incorporated in its entirety by reference herein.

FIELD

The present invention relates to contact lenses and to molds and mold inserts to form contact lenses. More particularly, the present invention relates to the use of dimples on a contact lens and to methods of making the same. The contact lenses having dimples can be considered dimpled contact lenses.

BACKGROUND

A healthy eye contains tear fluid located on the epithelium. Tear fluid is mostly water, and contains additional components such as mucoids, lipids and various antioxidant molecules such as enzymes and vitamins, which protect the eye and ocular surface from the effects of light and from contaminants.

Contact lenses provide vision correction and/or enhancement, cosmetic enhancement and/or both vision correction and cosmetic enhancement. Contact lenses are preferably designed to ensure that sufficient levels of oxygen are supplied to the eye, specifically, the cornea, to promote cornea health. However, current contact lenses may reduce the flow of nutrient laden tears to the cornea. This reduced flow of tears could adversely impact ocular health and/or lead to general wearer discomfort.

Accordingly, it would be desirable to provide contact lenses that can retain many, if not all, of the benefits of a contact lens and yet improve wearer comfort. Further, there is a need in the industry for contact lenses that can improve or increase the retention of tear fluid between the lens and the cornea.

SUMMARY

A feature of the present invention is to provide a contact lens that improves or increases the retention of tear fluid between the lens and the cornea, when the contact lens is being worn.

An additional feature of the present invention is to provide a contact lens that improves or increases the retention of tear fluid between the lens and the cornea and is comfortable to wear on the eye for extended periods of time.

A further feature of the present invention is to provide a contact lens that improves or increases the retention of tear fluid between the lens and the cornea, and yet has the same post-blink movement on an eye.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention, in part, relates to a contact lens. The contact lens includes a posterior surface having an optic zone, a peripheral zone, and a circumferential edge. The peripheral zone includes dimples that number at least 1000 dimples. The dimples provide a fill volume of at least 0.01 µl and have a dimple coverage of up to 80% based on a total surface area of the posterior surface.

The present invention further relates to a mold for cast molding of a contact lens. The mold includes a dome pattern, which is a negative pattern of a dimple pattern of dimples. The dimple pattern is formed on a peripheral zone of a contact lens molded therein. The dimples number at least 1000 dimples. The dimples provide a fill volume of at least 0.01 µl and have a dimple coverage of up to 80%.

In addition, the present invention relates to an injection molding insert for forming a mold for cast molding of a contact lens. The injection molding insert includes a dimple pattern of dimples that is formed on a peripheral zone of a cast molded contact lens. The dimples number at least 1000 dimples. The dimples provide a fill volume of at least 0.01 µl and have a dimple coverage of up to 80%.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

BRIEF DESCRIPTION OF THE DRAWINGS

FIG. 3 is a perspective view, depicting an example of two adjacent dimples that can be present in the contact lens of the present invention.

FIG. 4 is a cross-sectional view depicting an example of two adjacent dimples in a contact lens.

DETAILED DESCRIPTION

Figure 1:
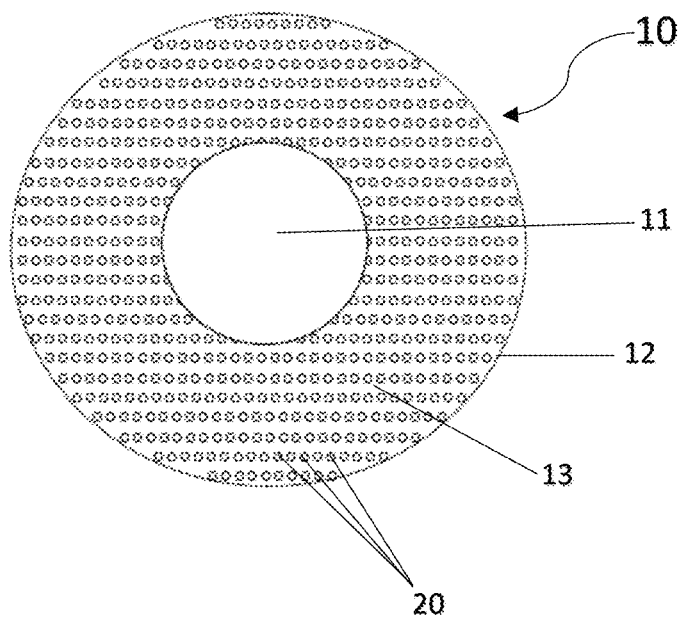
FIG. 1 is a view (not to scale) of a posterior side of one example of a dimpled contact lens.

Contact lenses having dimples as well as cast molds and injection molding inserts for manufacturing the contact lenses and methods of manufacturing the dimpled contact lens are described herein. The contact lens or lenses having the dimples is at times referred to, herein, as a dimpled contact lens.

In the present invention, the dimpled contact lens preferably retains tear fluid within the dimples, and thereby retains tear fluid in between the contact lens and the eye, which can improve lens comfort and ocular health in at least some wearers.

References herein to "an example" or "a specific example" or "an aspect" or "an embodiment" or similar phrase, are intended to introduce a feature or features of the dimpled contact lens, or components thereof, or method of manufacturing the dimpled contact lens (depending on context) that can be combined with any combination of previously-described or subsequently-described examples, aspects, embodiments (i.e. features), unless a particular combination of features is mutually exclusive, or if context indicates otherwise. Further, as used in this specification, the singular forms "a," "an," and "the" include plural referents (e.g. at least one or more) unless the context clearly dictates otherwise. Thus, for example, reference to a "contact lens" includes a single lens as well as two or more of the same or different lenses.

The dimpled contact lens has the ability to increase the amount of tear fluid that can be retained between the lens and the cornea, which may lead to increased comfort and/or ocular health. One or more of the dimples has the ability to create a fluid reservoir. The fluid reservoirs can increase post lens tear volume, help carry more packaging solution and/or comfort agents from the lens package to the eye, help retain post lens tear solution and/or help retain comfort agents if a comfort agent is dispensed onto the eye with the contact lens already present, reduce friction between the lens and the eye, reduce the area of the lens which contacts the eye, reduce nerve contact with the lens, reduce variation in osmolality, and/or improve surface wettability, and/or any combinations thereof.

The dimples can be considered pits or pockets, which are located on the posterior surface. The dimples can further be defined by their diameter, pitch (center to center distance between two dimples), and depth, which is described in more detail below. It is to be understood that for each of the measured parameters, the parameter can apply to a dry contact lens or can apply to a hydrated (e.g. fully hydrated) contact lens. When a dry contact lens with parameters is compared to the same contact lens that is fully hydrated, the parameters, such as diameter, pitch, and/or depth can be at least 1%, at least 2.5%, at least 5%, at least 10% higher for the hydrated contact lens as compared to the dry contact lens. The difference can be from about 1% to 25%, or 5% to 20%, or 10% to 25% higher for the hydrated contact lens compared to the dry contact lens.

With respect to the dimples, the dimples can, as an option, be considered micro-dimples.

The dimple diameter (for a dry or hydrated lens) can be at least about 5 µm, 10 µm, 15 µm, 20 µm, 25 µm, or 30 µm up to about 40 µm, 50 µm, 60 µm, 70 µm, 80 µm, 90 µm, or 100 µm. For instance, the dimple diameter can be from 5 µm to 100 µm or from 5 µm to 70 µm or from 5 µm to 50 µm or from 5 µm to 30 µm or from 10 µm to 50 µm, and the like. The size can be considered an average dimple diameter. The dimples, as an option, may include a narrow dimple diameter distribution such that each dimple diameter is within about 20%, 15%, 10%, 5%, or 1% of the average diameter. For example, dimples may each have a dimple diameter that is within about 5 µm or within 2.5 µm or within 1 µm of the average dimple diameter.

The dimple diameter of the dimples may be uniform relative to one another or may include a combination of more than one dimple diameter. For instance, the plurality of dimples may have two sets of dimples, one set that has a first dimple diameter and a second set that have a second dimple diameter. The average dimple diameter between the first set and second set can be any diameter, for instance, as provided above. The average dimple diameter between the first set and second set can vary by at least 5%, at least 10%, at least 20%, at least 50%, such as from 5% to 200% or 5% to 100% or 10% to 75%. Further, as an option, the plurality of dimples can have more than two sets of dimples such as three or four or more with different average dimple diameters. The arrangement of the dimples, when two or more sets of dimples are present, can be random, or arranged in any desired pattern (regions or sectors of each set, alternating, one annular zone of one set and a second annular zone of another set of dimples and so on). The dimples may include a bi-modal or multi-modal distribution of dimples in which the dimples include a combination of more than one type of dimple, each type having at least a different average dimple diameter.

The dimple pitch is a distance between dimple centers of two dimples next to each other (adjacent to each other). For instance, referring to FIG. 3, the ends of line b are located at the centers of two adjacent dimples (20), x and y. The length of line b is the pitch.

With respect to dimple pitch, the dimple pitch (for a dry or hydrated lens) can be at least about 5 µm, 10 µm, 20 µm, 30 µm, 40 µm, 50 µm, 60 µm, 70 µm, 80 µm up to about 90 µm, 100 µm, 110 µm, 120 µm, 130 µm, 140 µm, 150 µm, 160 µm, 170 µm, or 180 µm. For instance, the dimple pitch can be from about 10 µm to about 125 µm, or from about 15 µm to about 90 µm. The size can be considered an average dimple pitch. The dimples, as an option, may include a narrow dimple pitch distribution such that each dimple pitch is within about 20%, 15%, 10%, 5%, or 1% of the average dimple pitch.

The dimple pitch can be uniform relative to one another. As an option, the dimple pitches can be non-uniform. For instance, the plurality of dimples may have two or more sets or groups of dimple pitches due to the arrangement of dimples and spacing in between. When there is more than one set or group of dimple pitches present, each set or group of the dimple pitches can vary by at least 5%, at least 10%, at least 20%, at least 50%, such as from 5% to 100% or 10% to 75%.

When there are more than one dimple pitch present, the arrangement of the dimples when two or more sets of dimples are present can be random, or arranged in any desired pattern (regions or sectors of each set, alternating, one annular zone of one set and a second annular zone of another set of dimples and so on).

In another example, the distribution of dimples throughout the peripheral zone may be quasi-random. In such an example, the pitch between each pair of dimples is between a certain minimum value and a certain maximum value, but otherwise random. For example, a quasi-random distribution of dimples may include dimples distributed throughout a peripheral zone where each intra-dimple pitch is randomly distributed between the values of 20 µm and 40 µm.

A random or quasi-random distribution of dimples within or near the optic zone of the contact lens may reduce or avoid the possibility of visual impairments such as nighttime halos or glare. In one example, all dimples located within 5.5 mm, or 5 mm, or 4.5 mm of the center of the contact lens (i.e. the geometric center of the optic zone) have a quasi-random distribution.

In a further example, the contact lens comprises dimples located within 5 mm of the center of the contact lens having a quasi-random distribution and dimples located at least 5.5 mm from the center of the contact lens having a uniform distribution.

As an option, the contact lens can have no dimples located within 5.5 mm, or 5 mm, or 4.5 mm of the center of the contact lens (i.e. the geometric center of the optic zone).

For dimples having a paraboloid, cylindrical or other common dimple shape, the dimple depth (for a dry or hydrated lens) can generally be measured based on the length (or height) along a central axis of the dimple. For example, FIG. 3 shows an example of one type of dimple and the dimple depth would be the length of the line indicated by "a" in the FIG. 3.

The dimple depth can be at least about 2 µm, 5 µm, 10 µm, 15 µm, and up to about 30 µm, 40 µm, 50 µm, or 60 µm. For instance, the dimple depth can be from about 2 µm to about 60 µm, or from about 5 µm to about 40 µm, or from about 10 µm to about 30 µm. The size can be considered an average dimple depth. The dimples, as an option, may include a narrow dimple depth distribution such that each dimple depth is within about 20%, 15%, 10%, 5%, or 1% of the average dimple depth.

The dimple depth may be uniform relative to one another or may include a combination of more than one dimple depth. For instance, the plurality of dimples may have two sets of dimples, one set that has a first dimple depth and a second set that have a second dimple depth. The average dimple depth between the first set and second set can be any depth, for instance, as provided above. The average dimple depth between the first set and second set can vary by at least 5%, at least 10%, at least 20%, at least 50%, such as from 5% to 100% or 10% to 75%. Further, as an option, the plurality of dimples can have more than two sets of dimples such as three or four or more with different average dimple depths. The arrangement of the dimples when two or more sets of dimples are present can be random, or arranged in any desired pattern (regions or sectors of each set, alternating, one annular zone of one set and a second annular zone of another set of dimples and so on). The dimples may include a bi-modal or multi-modal distribution of dimples in which the dimples include a combination of more than one type of dimple, each type having at least a different average dimple depth.

As an option, a portion or all of the dimples can have an average dimple depth to average diameter ratio of at least 0.25, or at least 0.3, or at least 0.4 or at least 0.5. For instance, this ratio can be from 0.25 to 2.5 or from 0.25 to 2, or from 0.25 to 1.5 or from 0.3 to 2 or from 0.3 to 1.5, or any other ranges.

As an option, a portion or all of the dimples can have an average intra-dimple pitch to average diameter ratio of at least 1.25 or at least 1.5, or at least 2 or at least 2.5, such as from about 1.25 to 4, or from about 1.25 to 3.5, or 2 to 4 or other ranges.

The dimples can have any shape. The shape can be characterized by taking a cross-section of the dimple through the center axis. For instance, at least a portion or all of the dimples can have a shape that is circular, elliptical, triangular, rectangular, gaussian, parabolic, or an irregular shape or other geometric shapes. For instance, FIG. 3 illustrates two dimples (20) each having a parabolic shape. Additionally, the dimples have a top view that has a shape that may or may not be the same as the cross-sectional view. This top view may be a shape that is circular, elliptical, triangular, rectangular, an irregular shape, and the like. The plurality of dimples may have the same shape or a portion of the dimples may have one or more different shapes. For instance, the contact lens can have two sets of dimple shapes. The arrangement of the dimples when two or more sets of dimples are present can be random, or arranged in any desired pattern (regions or sectors of each set, alternating, one annular zone of one set and a second annular zone of another set of dimples and so on). The dimples may include a bi-modal or multi-modal distribution of dimples in which the dimples include a combination of more than one type of dimple, each type having at least a different shape.

The dimples have an edge about the opening of the dimple. As stated in more detail below, the sharpness of the edge can be a result of the manner in which the dimple is formed. With the present invention, the edge of a portion of or all the dimples can be smooth. As an option, the edge can be considered rounded or curved as opposed to being angled. FIG. 4 depicts two adjacent dimples (20), x and y, with dimple x having a curved edge (21) and dimple y having an angled edge (22). Smoother edges may further increase comfort to the wearer. As a further example, edge (21) of the dimple (20) is the edge that defines a mouth of the dimple (20), as illustrated in FIG. 4. The smooth edge (21) may be rounded such that the edge does not approach perpendicular to the posterior surface (17). Smooth edges may be fabricated by using a laser to create the dimples of a mold insert. The mold insert and its method of manufacture are described in more detail below.

The dimples can be also characterized by a "total fill volume", which is the amount of fluid that may be contained inside of all the dimples present on a single lens. The total fill volume can be at least 0.01 µl, 0.02 µl, 0.025 µl, 0.05 µl, 0.1 µl, 0.15 µl, 0.2 µl, 0.3 or 0.4 µl up to about 0.5 µl, 0.6 µl, 0.7 µl, 0.8 µl, 0.9 or 1 µl or more. The fill volume, V, of each individual dimple having a paraboloid shape may be calculated by the equation $V=\frac{1}{2}\pi \cdot r^2 \cdot a$, where, referring to FIG. 3, a is the length of the dimple's central axis (i.e. dimple depth) and r is the radius of the opening of the dimple. The thickness of the post-contact lens tear film has been shown to be approximately 2.3 µm (Nichols and King-Smith, Invest Ophthalmol Vis Sci (2003) 44(1):68-77). For a contact lens having a posterior surface area of approximately 210 mm2, the volume of tear fluid behind the lens is approximately 0.5 µl. A dimpled contact lens has the ability of holding an increased volume of tear fluid, or other fluid, compared to a control lens due to the total fill volume of the dimples. As used herein, a "control lens" refers to a contact lens that has no dimples present in the lens, but is otherwise identical to the contact lens (i.e. test lens) to which it is being compared in that it was manufactured using the same contact lens formulation (referred to herein sometimes as a "polymerizable composition"), and subjected to the same manufacturing processes.

A percentage of volume increase of the dimpled contact lens as compared to a control lens can be from about 5%, 10%, 20%, 30%, 40%, 50%, or 60% up to about 70%, 80%, 90%, 100%, 120%, 150%, or 200% or more.

The dimples that are present on the contact lens can be any number. Preferably, the number of dimples is at least about 1,000 dimples, such as on the posterior surface. For example, the total number can be from about 1,000 to 1,000,000, or from about 2,000 to 1,000,000, or from about 5,000 to 1,000,000, or from about 10,000 to about 1,000,000, or from about 15,000 to 1,000,000, or from about 20,000 to 1,000,000, or from about 30,000 to 1,000,000, or from about 40,000 to 1,000,000, or from about 50,000 to 1,000,000, or from about 10,000 to 500,000, or from about 10,000 to 250,000, or from about 10,000 to 200,000 and the like. These numbers can be the total dimples, such as on just the posterior surface.

As an option, none of the dimples on a surface are in contact with any other dimple. In other words, each intra-dimple pitch of the contact lens is greater than 1.

The dimples on the contact lens, as an option can have dimples in the peripheral zone only (of the posterior side). For instance, FIG. 1 depicts the posterior surface of a contact lens (10) having a central optic zone (11) a circumferential edge (12) and a peripheral zone (13) between the optic zone and circumferential edge. In this configuration, all dimples (20) are contained in the peripheral zone.

Figure 2:
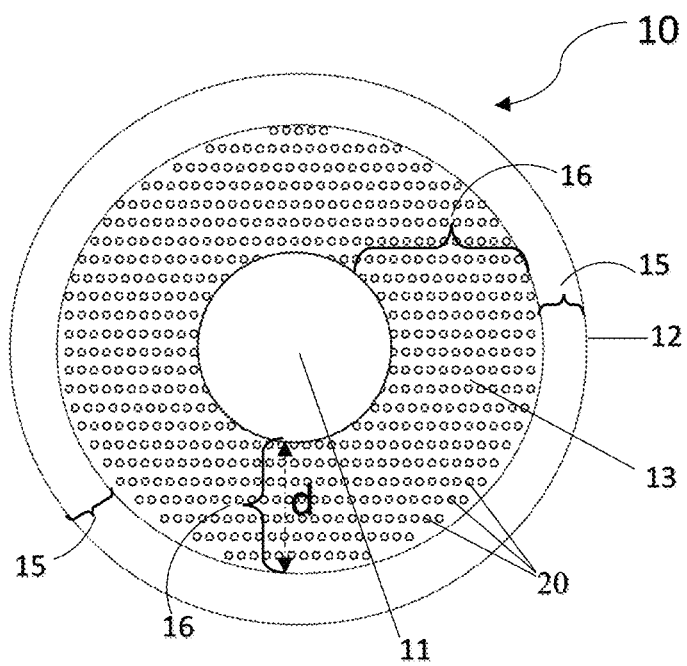
FIG. 2 is a view of a posterior side of another example of a dimpled contact lens.

The dimples on the contact lens, as an option can have dimples in the peripheral zone but may have an area that is void of dimples near the circumferential edge. For instance, as shown in FIG. 2, a contact lens (10) has an optic zone (11) void of dimples, circumferential edge (12), and a peripheral zone comprising two ring portions, an outer ring portion (15) void of dimples and an inner ring portion (16) containing dimples (20). The outer most portion of the peripheral zone (13) having dimples (20) can be a distance from the circumferential edge (12), such as a distance of from 0.01 mm to 2.0 mm or from 0.25 mm to 1.5 mm, or from 0.5 mm to 2.0 mm or other distances. The chord distance of the peripheral zone that has dimples (distance 'd' in FIG. 2) can be from about 2 mm to 6 mm, such as from 2 mm to 5 mm or from 2 mm to 4 mm. In one example, all dimples on the contact lens are located at least 4.5 mm, or 5 mm, or 5.5 mm from the center of the contact lens (i.e. the center of the optic zone) so as to reduce or avoid possible visual impairments such as nighttime halos or glare.

The dimpled contact lens can be further characterized by dimple coverage. Dimple coverage is the percentage of dimple coverage relative to a total surface area of the surface that contains the dimples, e.g. the posterior surface, where total surface area is taken to be the same as the surface area of a corresponding surface (i.e. posterior surface) of a control lens. In other words, the surface area of each dimple is not included in the total surface area, but the area of the opening of each dimple is (i.e. $\pi \cdot r^2$ in the case of dimples having a circular opening). The dimple coverage on a side of a lens can be at least about 4%, 5%, 10%, 15%, 20%, or 30% up to about 40%, 50%, 60%, 70%, or 80% or more of the total area of a side of a lens, such as the posterior surface area. For example, referring to FIG. 1, if peripheral zone (13) comprises 60% of the posterior surface area of contact lens (10) and 40% of the surface area of the peripheral zone comprises dimples (20), then the dimple coverage on the posterior surface of the lens would be 24%.

The dimpled contact lens can also be characterized by a packing density. Packing density is the percentage of dimples within the dimpled or textured area. The packing density may be least about 6%, 10%, 15%, 20%, or 30% up to about 40%, 50%, 60%, 70%, 80% or 90% of this area. Thus, referring again to FIG. 1, if 40% of the peripheral zone (13) comprises dimples (20), then the packing density of the dimpled area is 40%.

Figure 5:
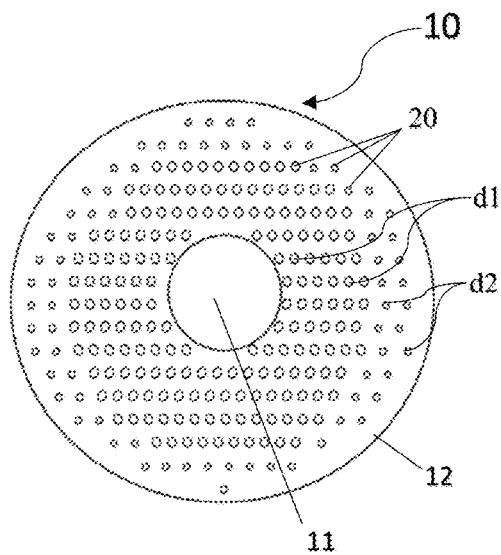
FIG. 5 is a view of a posterior side of another example of a dimpled contact lens.
Figure 6:
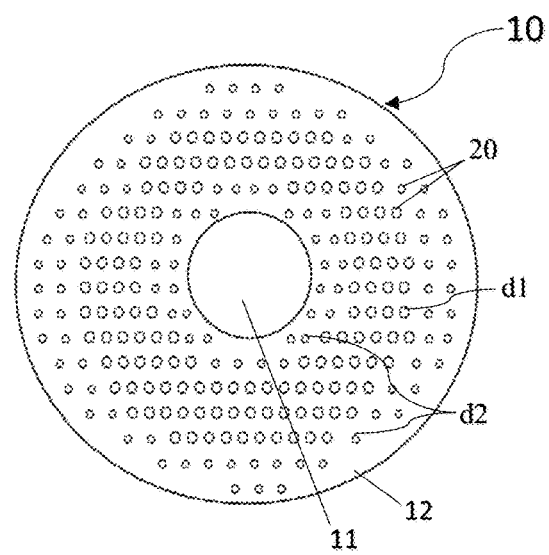
FIG. 6 is a view of a posterior side of another example of a dimpled contact lens.

As an option, one or more parameters of the dimples (as described herein) may vary (e.g. taper) towards the circumferential edge and/or towards the optic zone. For example, the dimples' diameter and depth may decrease towards the circumferential edge and towards the optic zone (or vice versa), while the dimple pitch may increase towards the circumferential edge and towards the optic zone (or vice versa). For example, FIG. 5 depicts contact lens (10) comprising dimples (20) in its peripheral zone. A first set of the dimples surrounds optic zone (11) with each dimple of the first set having a diameter, d1. A second set of dimples is located just inside of the circumferential edge (12) with each dimple of the second set having a smaller diameter, d2. FIG. 6 depicts contact lens (10) having dimples of a smaller diameter, d2, in a first zone surrounding the optic zone (11) and a third zone inside the circumferential edge (12), with dimples having a larger diameter, d1, in a second zone located between the first and third zones.

Figure 7:
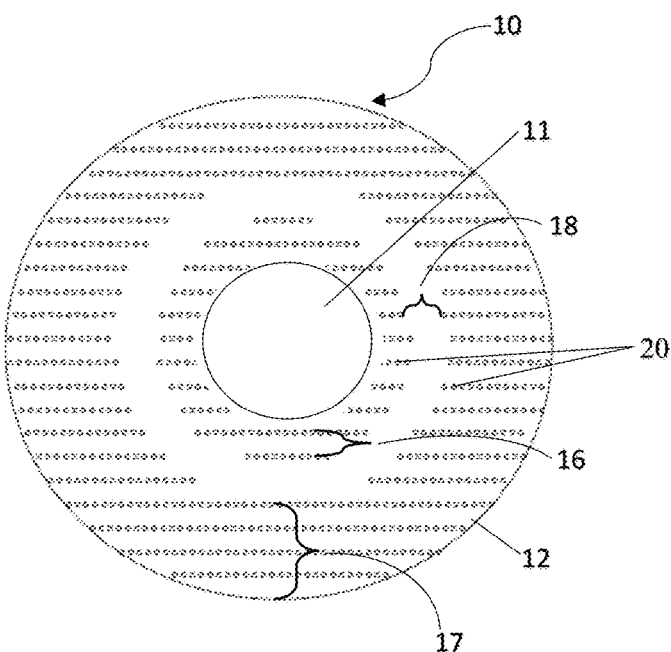
FIG. 7 is a view of a posterior side of another example of a dimpled contact lens.
Figure 8:
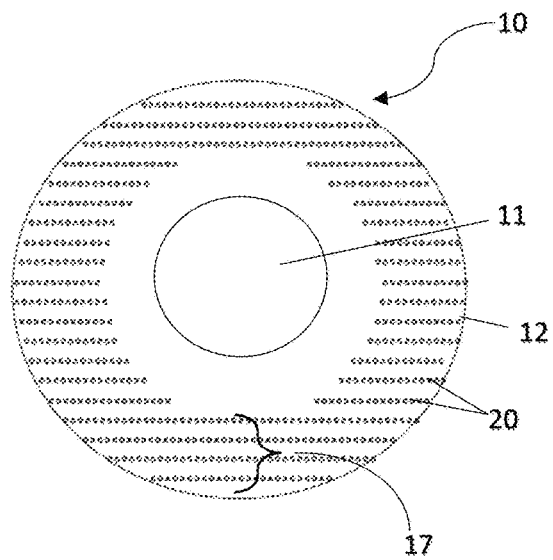
FIG. 8 is a view of a posterior side of another example of a dimpled contact lens.
Figure 9:
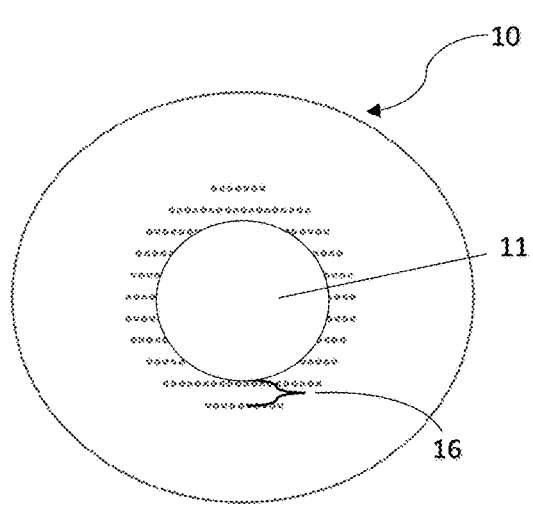
FIG. 9 is a view of a posterior side of another example of a dimpled contact lens.

As an option, the peripheral zone may include one or more areas having no dimples. For example, FIG. 7 depicts a contact lens (10) having an optic zone (11) void of dimples, a circumferential edge (12), and a peripheral zone comprising an inner ring portion (16) containing dimples, a middle ring portion (18) void of dimples and an outer ring portion (17) containing dimples (20). Stated differently, the peripheral zone may include an outer ring of dimples and an inner ring of dimples separated by an area void of dimples. Alternatively, as depicted in FIG. 8, the peripheral zone may include only an outer ring portion (17) containing dimples (20) adjacent to the circumferential edge (12) or, as depicted in FIG. 9, only an inner ring portion (16) of dimples (20) adjacent to the optic zone (11).

As an option, when the surface of the lens having dimples is viewed, such as shown in FIG. 1, there is no overall discernable geometric shape or pattern created by the overall, collective view of the dimples. For example, the dimples do not have the appearance of a spoke pattern, a line pattern, or a ring pattern and have the appearance of being randomly or uniformly dispersed about the peripheral zone. For instance, as shown in FIG. 1, the view overall does not provide any discernable geometric shape based on dimple location.

Figure 10A:
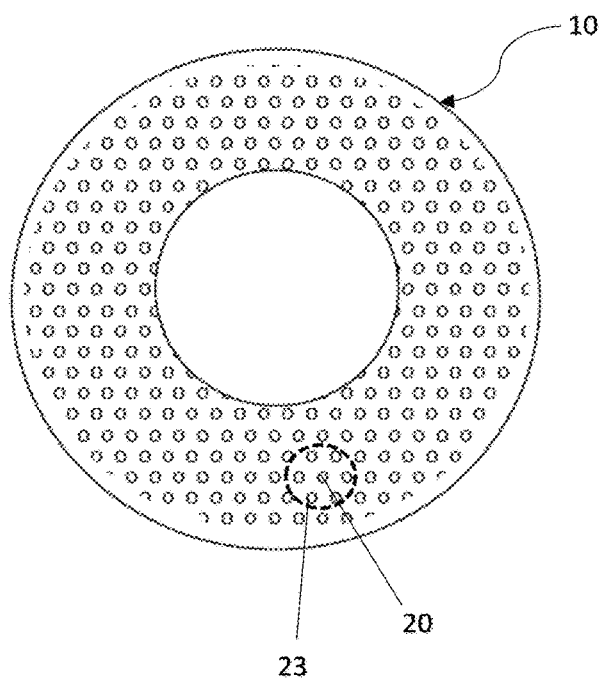
FIG. 10A is a view of a posterior side of an example of a dimpled contact lens and shows a cluster of dimples.
Figure 10B:
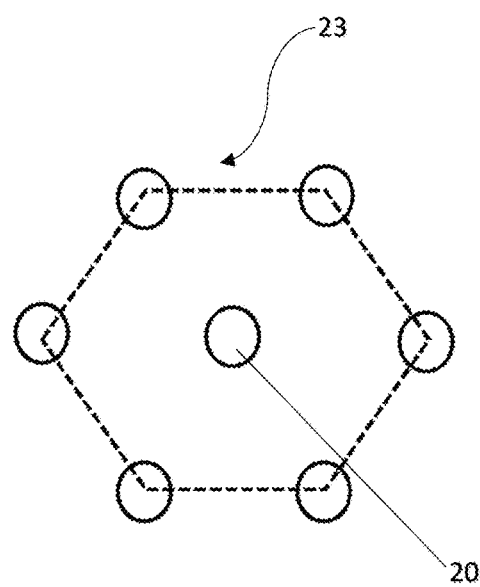
FIG. 10B shows an enlarged depiction of a cluster of dimples that form part of the dimpled contact lens of FIG. 10A.

In one example, the dimples of the dimpled contact lens may be made up of many clusters of dimples, where each cluster forms a well-ordered pattern, such as a hexagonal shape, a cubic, shape, a polygonal shape, and the like. In such example, there may be no overall discernable geometric shape created by the clusters of the dimples. For example, FIG. 10A depicts a dimpled contact lens (10) comprising clusters of dimples (23) where the collective view of all of the dimples of the contact lens does not have an overall discernable geometric shape. The dimples appear uniformly distributed on the lens. FIG. 10B depicts the hexagonal arrangement of cluster of dimples (23) shown in FIG. 10A, wherein a single cluster of dimples comprises a central dimple (20) with six peripheral dimples arranged as if on the vertices of a hexagon.

As used herein, 'substantially the same' means within 15%, within 10%, within 5%, or within 1% of one measured property or two or more of the measured properties, and a measurement that is 'the same' is within the measurement of error of the property measurement.

Due to the dimple parameters and/or their placement, the dimpled contact lens, after swelling in an aqueous fluid, can have the same or substantially the same equilibrium water content (EWC) as compared to a control lens.

Due to the dimple parameters and/or their placement, the dimpled contact lens can have a coefficient of friction (CoF) that is same or substantially the same as a control lens.

Due to the dimple parameters and/or their placement, the dimpled contact lens can have the same or substantially the same oxygen transmission as a control lens.

The dimpled contact lens can generally have less overall contact area with the eye (e.g. surface area in contact with the cornea) as compared to a control lens. For instance, the reduced contact area can be at least 2%, or at least 5%, at least 10%, at least 15%, or at least 25%, such as from about 5% to 25% or 5% to 15% reduction in the total surface area of the posterior surface area that touches the eye (or cornea).

The dimpled contact lens can have the same or substantially the same post-blink movement (PBM) on an eye compared to a control lens. In one example, the dimpled contact lens can have an amount of PBM that is no greater than that of the control lens.

The dimpled contact lens can have an amount of downgaze movement on an eye that is the same or substantially the same or less than that of the control lens. In one example, the dimpled contact lens can have an amount of downgaze movement on an eye that is no greater than that of the control lens.

To measure an amount of PBM, a slit lamp microscope fitted with an eyepiece graticule can be used. For instance, measurements are taken at a magnification of ×10. The amount of PBM is measured immediately after a blink with the lens-wearer fixating in the primary-gaze position. The measurement is made by observing the inferior edge of the lens. The measurement is recorded in millimeters to the nearest 0.05 mm using a vertically oriented eyepiece graticule.

The dimpled contact lens can be made from any lens material that is conventional in the art. The contact lens can be a hard or soft contact lens. Preferably, the contact lens is a hydrogel contact lens. The contact lens can preferably be made from or is a silicone hydrogel material.

A silicone hydrogel material is typically formed by curing a polymerizable composition (i.e. a monomer mixture) comprising at least one siloxane monomer and at least one hydrophilic monomer or at least one hydrophilic polymer, or a combination thereof. A "monomer" refers to a molecule comprising a polymerizable carbon-carbon double bond (i.e. a polymerizable group) capable of reacting with other polymerizable group-containing molecules that are the same or different, to form a polymer or copolymer. The term monomer encompasses polymerizable pre-polymers and macromers, there being no size constraint of the monomer unless indicated otherwise. The monomer may comprise a single polymerizable carbon-carbon double bond, or more than one polymerizable group, and thus have cross-linking functionality. As used herein, the term "siloxane monomer" is a monomer that contains at least one Si—O group. Siloxane monomers useful in contact lens compositions are well-known in the art (see, e.g., U.S. Pat. Nos. 8,658,747 and 6,867,245). (All patents and publications mentioned here and throughout are incorporated in their entirety by reference.) In some examples, the polymerizable composition comprises a total amount of siloxane monomer of at least 10 wt. %, 20 wt. %, or 30 wt. % up to about 40 wt. %, 50 wt. %, 60 wt. %, or 70 wt. %. Unless specified otherwise, as used herein, a given weight percentage (wt. %) of a component of the polymerizable composition is relative to the total weight of all polymerizable ingredients and IPN polymers (as described further below) in the polymerizable composition. The weight of the polymerizable composition contributed by components, such as diluents, that do not incorporate into the final contact lens product are not included in the wt. % calculation.

In a specific example, the polymerizable composition comprises a hydrophilic vinyl monomer. As used-herein, a "hydrophilic vinyl monomer" is any siloxane-free (i.e. contains no Si—O groups) hydrophilic monomer having a polymerizable carbon-carbon double bond (i.e., a vinyl group) present in its molecular structure that is not part of an acryl group, where the carbon-carbon double bond of the vinyl group is less reactive than the carbon-carbon double bond present in a polymerizable methacrylate group under free radical polymerization. As used herein, the term "acryl group" refers to the polymerizable group present in acrylate, methacrylates, acrylamides, etc. Thus, while carbon-carbon double bonds are present in acrylate and methacrylate groups, as used herein, such polymerizable groups are not considered to be vinyl groups. Further, as used herein, a monomer is "hydrophilic" if at least 50 grams of the monomer are fully soluble in 1 liter of water at 20° C. (i.e., ~5% soluble in water) as determined visibly using a standard shake flask method. In various examples, the hydrophilic vinyl monomer is N-vinyl-N-methylacetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof. In one example, the polymerizable composition comprises at least 10 wt. %, 15 wt. %, 20 wt. %, or 25 wt. % up to about 45 wt. %, 60 wt. %, or 75 wt. % of a hydrophilic vinyl monomer. As used herein, a given weight percentage of a particular class of component (e.g., hydrophilic vinyl monomer, siloxane monomer, or the like) in the polymerizable composition equals the sum of the wt. % of each ingredient in the composition that falls within the class. Thus, for example, a polymerizable composition that comprises 5 wt. % BVE and 25 wt. % NVP and no other hydrophilic vinyl monomer, is said to comprise 30 wt. % hydrophilic vinyl monomer. In one example, the hydrophilic vinyl monomer is a vinyl amide monomer. Exemplary hydrophilic vinyl amide monomers are VMA and NVP. In a specific example, the polymerizable composition comprises at least 25 wt. % of a vinyl amide monomer. In a further specific example, the polymerizable composition comprises from about 25 wt. % up to about 75 wt. % of VMA or NVP, or a combination thereof. Additional hydrophilic monomers that may be included in the polymerizable composition are N,N-dimethylacrylamide (DMA), 2-hydroxyethyl methacrylate (HEMA), ethoxyethyl methacrylamide (EOEMA), ethylene glycol methyl ether methacrylate (EGMA), and combinations thereof.

In addition, or as an alternative to a hydrophilic monomer, the polymerizable composition may comprise a non-polymerizable hydrophilic polymer, which results in a polymeric lens body comprising an interpenetrating polymer network (IPN) with the non-polymerizable hydrophilic polymer interpenetrating the silicone hydrogel polymer matrix. In this example, the non-polymerizable hydrophilic polymer is referred to as an IPN polymer, which acts as an internal wetting agent in the contact lens. In contrast, polymer chains within the silicone hydrogel network that form by polymerization of monomers present in the polymerizable composition are not considered to be IPN polymers. The IPN polymer may be a high molecular weight hydrophilic polymer, for example from about 50,000 to about 500,000 Daltons. In a specific example, the IPN polymer is polyvinylpyrrolidone (PVP). In other examples, the polymerizable composition is substantially free of polyvinyl pyrrolidone or other IPN polymer.

The polymerizable composition may additionally comprise at least one cross-linking agent. As used herein, a "cross-linking agent" is a monomer having at least two polymerizable groups. Thus, a cross-linking agent can react with functional groups on two or more polymer chains so as to bridge one polymer to another. The cross-linking agent may comprise an acryl group or a vinyl group, or both an acryl group and a vinyl group. In certain examples, the cross-linking agent is free of siloxane moieties, i.e., it is a non-siloxane cross-linking agent. A variety of cross-linking agents suitable for use in silicone hydrogel polymerizable compositions are known in the field (see, e.g., U.S. Pat. No. 8,231,218, incorporated herein by reference). Examples of suitable cross-linking agents include, without limitation, lower alkylene glycol di(meth)acrylates such as triethylene glycol dimethacrylate and diethylene glycol dimethacrylate; poly(lower alkylene) glycol di(meth)acrylates; lower alkylene di(meth)acrylates; divinyl ethers such as triethyleneglycol divinyl ether, diethyleneglycol divinyl ether, 1,4-butanediol divinyl ether and 1,4-cyclohexanedimethanol divinyl ether; divinyl sulfone; di- and trivinylbenzene; trimethylolpropane tri(meth)acrylate; pentaerythritol tetra(meth)acrylate; bisphenol A di(meth)acrylate; methylenebis(meth)acrylamide; triallyl phthalate; 1,3-Bis(3-methacryloxypropyl)tetramethyldisiloxane; diallyl phthalate; and combinations thereof.

As will be appreciated by those skilled in the art, the polymerizable composition may comprise additional polymerizable or non-polymerizable ingredients conventionally used in contact lens formulations such as one or more of a polymerization initiator, a UV absorbing agent, a tinting agent, an oxygen scavenger, a chain transfer agent, or the like. In some examples, the polymerizable composition may include an organic diluent in an amount to prevent or minimize phase separation between the hydrophilic and hydrophobic components of the polymerizable composition, so that an optically clear lens is obtained. Diluents commonly used in contact lens formulations include hexanol, ethanol, and/or other alcohols. In other examples, the polymerizable composition is free or substantially free (e.g., less than 500 ppm) of an organic diluent. In such examples, the use of siloxane monomers containing hydrophilic moieties such as polyethylene oxide groups, pendant hydroxyl groups, or other hydrophilic groups, may make it unnecessary to include a diluent in the polymerizable composition. Non-limiting examples of these and additional ingredients that may be included in the polymerizable composition are provided in U.S. Pat. No. 8,231,218.

Non-limiting examples of silicone hydrogels that may be used include comfilcon A, fanfilcon A, stenfilcon A, senofilcon A, senofilcon C. somofilcon A, narafilcon A, delefilcon A, narafilcon A, lotrafilcon A, lotrafilcon B, balafilcon A, samfilcon A, galyfilcon A, and asmofilcon A.

As stated, in preferred embodiments, the contact lens of the present invention can be considered a soft contact lens, and particularly a soft silicone hydrogel contact lens.

The contact lens may be of any lens wear modality. Lens wear modality refers to the how many days and nights in a row the lens can be worn without removal. In one example, the contact lens is a daily disposable lens. Daily disposable lenses are indicated for single use, up to about 12 or 16 hours of continuous wear and should be discarded after the single use. In another example, the contact lens is a daily wear lens. Daily wear lenses are worn during the waking hours, typically up to about 12 to 16 hours, and are removed before sleep. Daily wear lenses are typically stored in a contact lens case containing a contact lens care solution for cleaning and disinfecting the lens during the hours of non-use. Daily wear lenses are typically discarded after a maximum of 30 days wear. In yet another example, the contact lens is an extended wear lens. Extended wear lenses are typically worn continuously for up to 6, 14 or 30 consecutive days and nights.

As part of the present invention, the dimpled contact lens can be sealed in a contact lens package. The packaging solution sealed within the contact lens package may be any conventional contact-lens compatible solution. In one example, the packaging solution comprises, consists, or consists essentially, of an aqueous solution of a buffer, and/or a tonicity agent. In another example, the packaging solution contains additional agents such as one or more additional antimicrobial agents, and/or a comfort agent, and/or a hydrophilic polymer, and/or a surfactant and/or other beneficial agent. In some examples, the packaging solution may comprise polysaccharides (e.g. hyaluronic acid, hydroxypropyl methylcellulose, hydroxypropyl cellulose, hydroxyethyl cellulose, etc.) or other high molecular weight polymers, such as polyvinyl pyrrolidone, which are commonly used as comfort polymers or thickening agents in ophthalmic solutions and contact lens packaging solutions. In other examples, the packaging solution may comprise an ophthalmic drug. The packaging solution can have a pH in the range of about 6.8 or 7.0 up to about 7.8 or 8.0. In one example, the packaging solution comprises phosphate buffer or borate buffer. In another example, the packaging solution comprises a tonicity agent selected from sodium chloride or sorbitol in an amount to maintain osmolality in the range of about 200 to 400 mOsm/kg, and typically from about 270 mOsm/kg up to about 310 mOsm/kg.

With respect to the contact lens package, this package can include or comprise a plastic base member comprising a cavity configured to retain the contact lens and packaging solution and a flange region extending outwardly around the cavity. A removable foil is attached to the flange region to provide a sealed contact lens package. Such contact lens packages, which are commonly referred to as "blister packs", are well-known in the art (see e.g. U.S. Pat. No. 7,426,993).

It will be appreciated that conventional manufacturing methods can be used to manufacture the sealed contact lens package. In a method of manufacturing a contact lens package, the method can include the step of placing an unworn contact lens and a contact lens packaging solution in a receptacle, placing a cover on the receptacle, and sealing the cover on the receptacle. Generally, the receptacle is configured to receive a single contact lens and an amount of packaging solution sufficient to completely cover the contact lens, typically about 0.5-1.5 ml. The receptacle may be made from any suitable material, such as glass or plastic. In one example, the receptacle comprises a plastic base member comprising a cavity configured to retain the contact lens and packaging solution and a flange region extending outwardly around the cavity, and the cover comprises a removable foil attached to the flange region to provide the sealed contact lens package. The removable foil may be sealed by any conventional means such as heat sealing or gluing. In another example, the receptacle is in the form of a plastic base member comprising a plurality of threads and the cover comprises a plastic cap member comprising a compatible set of thread for engagement with the threads of the base member thereby providing a resealable cover. It will be appreciated that other types of packaging can also be used to provide a resealable package. For example, the contact lens package may comprise a plastic cover comprising features that engage with compatible features of the receptacle to form an interference fit. The method of manufacturing the sealed contact lens package may further comprise sterilizing the unworn contact lens by autoclaving the sealed contact lens package. Autoclaving generally involves subjecting the sealed contact lens package to temperatures of at least 121° C. for at least 20 minutes.

The dimpled contact lens can be provided unworn (i.e. a new contact lens, not having been previously used by a patient), immersed in the packaging solution and sealed in a package. The package may be a blister package, glass vial, or other appropriate container. The package comprises a base member having a cavity for accommodating a packaging solution and an unworn contact lens. The sealed package may be sterilized by sterilizing amounts of radiation, including heat or steam, such as by autoclaving, or by gamma radiation, e-beam radiation, ultraviolet radiation, etc.

In a specific example, the packaged dimpled contact lens is sterilized by autoclaving.

The final product can be a sterile, packaged dimpled contact lens (e.g. silicone hydrogel dimpled contact lens) having ophthalmically-acceptable surface wettability.

The dimples of the dimpled contact lens can transfer an additional volume of solution from the blister package or other fluid added, such as from a bottle or eyedropper. For instance, at least an additional amount of at least 0.025 µl of the packaging solution or other fluid can be transferred to the posterior surface from the blister pack or from another source, such as an eye drop, to the ocular surface, as compared to a control lens. Accordingly, the dimpled contact lens may be used in a method of delivering a beneficial agent to the ocular surface of a subject. In one example, the method comprises removing a dimpled contact lens from a blister package packaging solution and placing the dimpled contact lens on the cornea of the subject, wherein the packaging solution comprises the beneficial agent. In another example, the method comprises applying an ophthalmic solution to the posterior surface of a dimpled contact lens and placing the dimpled contact lens on the cornea of the subject, wherein the ophthalmic solution comprises the beneficial agent.

In making the contact lens of the present invention, a mold insert (also known as a master mold or mold tool) is formed, which is then used to form a mold member. The mold insert is made in a conventional way except the desired dimple parameters and pattern are first formed on a surface of the mold insert. As discussed above in preferred embodiments, the posterior surface is the surface having the dimple pattern and thus the mold insert used to form the male mold member can be formed to have the desired dimple parameters and pattern. The dimple parameters and pattern can be formed on the mold insert using any techniques such as laser micro-machining and/or nano imprint lithography, and preferably by laser ablation. The mold insert is used to form a mold member by cast molding or injection molding. Typically, a thermoplastic material is used to form the mold member, such as, but not limited to, polypropylene, ethylene vinyl alcohol, polyethylene terephthalate, and the like. As can be appreciated, the surface of the mold member to provide the dimple pattern to the contact lens has the negative pattern of the dimple pattern present on the mold insert. If the anterior side of the lens has no dimples, a conventional female mold insert can be used to form the female mold member. A polymerizable composition is dispensed into a female mold member having a concave surface that defines the anterior surface of the dimpled contact lens. Thus, according to a preferred method, the male mold member having a convex surface that defines the posterior surface of the dimpled contact lens is combined with the female mold member to form a contact lens mold that is subjected to curing conditions, such as UV or thermal curing conditions, under which the curable composition is formed into a polymeric lens body. The female and male mold members can be non-polar molds or polar molds. The mold is disassembled (i.e. demolded) and the polymeric lens body is removed from the mold and contacted with an organic solvent, such as ethanol, to extract unreacted components from the lens body. After extraction, the lens body is hydrated in an aqueous solution. Exemplary methods of manufacturing silicone hydrogel contact lenses are described in U.S. Pat. No. 8,865,789.

Figure 11A:
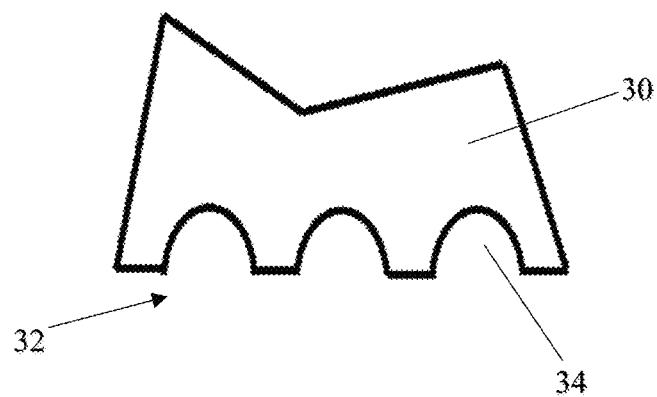
FIG. 11A is a detailed cross-sectional view, depicting a dimple pattern of a mold insert.
Figure 11B:
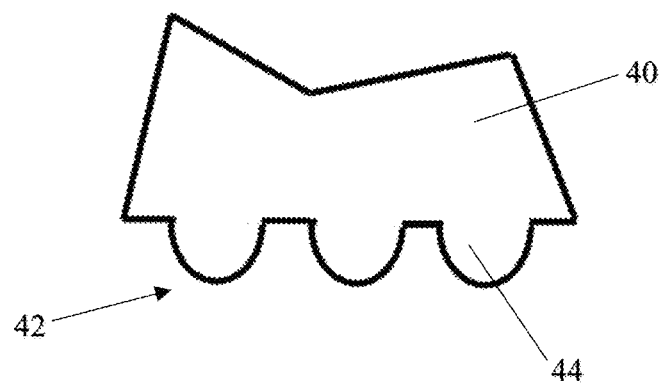
FIG. 11B is a detailed cross-sectional view, depicting a dome pattern of a male mold member.
Figure 11C:
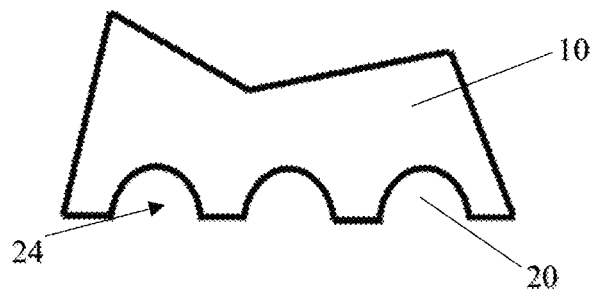
FIG. 11C is a detailed cross-sectional view, depicting a dimple pattern of a dimpled contact lens.

FIGS. 11A through 11C illustrate a partial exploded sectional view (not to scale) of an injection molding insert (30) and a male mold member (40) of a molding assembly used to manufacture the dimpled contact lens (10). The injection molding insert (30) is first used to create the male mold member (40). The injection molding insert (30) may be considered a master mold or a mold tool. The injection molding insert (30) includes a dimple pattern (32) of dimples (34). The dimple pattern (32) of the injection molding insert (30) is the same dimple pattern (24) that is cast on a contact lens (not accounting for shrinkage of the male mold member and/or shrinkage or swelling of the contact lens material). The dimple pattern (32) of the injection molding insert (30) is designed with consideration for swelling of the dry lens to a hydrated wet contact lens. As mentioned above, the dimple pattern (32) may be lasered into the injection molding insert (30). Laser ablation provides a smooth edge/side, compared to a dimple that is machined into the injection molding insert (30). The injection molding insert (30) is used to injection mold a thermoplastic polymer, such as polypropylene, and the resulting contact lens mold (the male mold member (40)) has domes (44) on its surface.

As mentioned above, in the preferred embodiments, the convex surface of the male mold member (40) of the mold has a dome pattern (42) including domes (44). The dome pattern (42) is a negative pattern of the desired dimple pattern (24) on a dry dimpled contact lens (10). The dome pattern (42) thereby forms the dimple pattern on the contact lens molded therein, the dimples (20) including the same dimensions and characteristics described above of a dry dimpled contact lens (10).

As an alternative to using an injection molding insert to create the male mold member, domes can be placed directly on a plastic mold (for example imprinted), which creates the dimples on the dimpled contact lens.

The following Examples illustrate certain aspects and advantages of the present invention, which should be understood not to be limited thereby.

Example 1

Parabolic-shaped dimples were formed on metal inserts for male contact lens mold members by laser ablation. The metal inserts were used to injection mold polypropylene male contact lens mold members having domes on the molding surface. Silicone hydrogel contact lenses were prepared by dispensing a polymerizable silicone hydrogel composition for stenfilcon A into a female mold. A male mold member with the dome pattern (that has the negative pattern of the dimple pattern on the corresponding metal insert for the male mold member) was combined with the female mold member to form a contact lens mold and subjected to curing conditions. The mold was disassembled (i.e. demolded) and the cured polymeric lens body was removed from the mold. The dimples on the posterior surface of the polymeric lens body had the same dimensions as the dimples on the corresponding metal insert (not accounting for shrinkage).

The polymeric lens body was contacted with an organic solvent to extract unreacted components from the lens body. The lens body was then hydrated in an aqueous solution. Because the stenfilcon A material has a swell factor of 22%, meaning that the size of the fully hydrated contact lens is 22% greater than the size of the polymeric lens body (i.e. the dry lens) prior to extraction and hydration, the dimension of each dimple of the hydrated lens was 22% greater than the dimension of each dimple on the polymeric lens body (and on the metal insert).

Example 2

Exemplary dimple dimensions for metal inserts (and polymeric lens bodies) and hydrated lenses made from stenfilcon A are shown in TABLE 1. The values presented in the last four rows (number of dimples (rounded to nearest 1000), % dimple coverage, fill volume, and % volume increase) are dependent on the size of the contact lens and the size of the portion(s) of the contact lens that contains dimples. In the case of TABLE 1, the values for these parameters are based on a hydrated contact lens diameter of 14.2 mm, an 8 mm diameter optic zone free of dimples, a peripheral zone having dimples uniformly distributed therein with the exception that the outer-most region of the peripheral zone within 0.1 mm from the circumferential edge of the hydrated contact lens is void of dimples. Thus, the width of dimpled portion of the contact lens is 3.0 mm.

TABLE 1

|  | A | B | C | D | E | F | G |
| --- | --- | --- | --- | --- | --- | --- | --- |
| Insert Dimple Diam. (μm) | 10 | 10 | 20 | 20 | 20 | 30 | 10 |
| Insert Dimple Depth (μm) | 5 | 5 | 15 | 15 | 15 | 22.5 | 5 |
| Insert Dimple Pitch (μm) | 20 | 15 | 80 | 40 | 30 | 60 | 40 |
| Lens Dimple Diam. (μm) | 12.2 | 12.2 | 24.4 | 24.4 | 24.4 | 36.6 | 12.2 |
| Lens Dimple Depth (μm) | 6.1 | 6.1 | 18.3 | 18.3 | 18.3 | 27.5 | 6.1 |
| Lens Dimple Pitch (μm) | 24.4 | 18.3 | 97.6 | 48.8 | 36.6 | 73.2 | 48.8 |
| Pitch/Diam. | 2.0 | 1.5 | 4.0 | 2.0 | 1.5 | 2.0 | 4 |
| Depth/Diam. | 0.50 | 0.50 | 0.75 | 0.75 | 0.75 | 0.75 | 0.5 |
| % Packing Density | 23% | 40% | 6% | 23% | 40% | 23% | 6% |
| Number of Dimples (thousand) | 281 | 499 | 18 | 70 | 125 | 31 | 70 |
| % Dimple Coverage | 16% | 28% | 4% | 16% | 28% | 16% | 4% |
| Fill Vol. (μl) | 0.10 | 0.18 | 0.08 | 0.30 | 0.53 | 0.45 | 0.03 |
| % Vol. Increase | 21% | 37% | 16% | 63% | 112% | 94% | 5% |

TABLE 2 shows the number of dimples, % dimple coverage, fill volume, and % volume increase, and total number of dimples for lenses that are the same as the lenses described above for TABLE 1, except that the inner perimeter of the dimpled portion of the lens is 5.5 mm from the center of the optic zone, and the outer perimeter of the dimpled portion is located 0.1 mm from the circumferential edge of the hydrated contact lens. Thus, the width of dimpled portion of the contact lens is 1.5 mm.

TABLE 2

|  | A | B | C | D | E | F | G |
| --- | --- | --- | --- | --- | --- | --- | --- |
| Number of Dimples (thousand) | 175 | 310 | 11 | 44 | 78 | 19 | 44 |
| % Dimple Coverage | 10% | 18% | 2% | 10% | 18% | 10% | 2% |
| Fill Vol. (μl) | 0.06 | 0.11 | 0.05 | 0.19 | 0.33 | 0.28 | 0.02 |
| % Vol. Increase | 13% | 23% | 10% | 39% | 70% | 59% | 3% |

The present invention includes the following aspects/embodiments/features in any order and/or in any combination:

1. The present invention relates a contact lens comprising: a posterior surface having an optic zone, a peripheral zone, and a circumferential edge and said peripheral zone having dimples that number at least 1000 dimples, wherein the dimples provide a fill volume of at least 0.01 μl and have a dimple coverage of up to 80% based on a total surface area of said posterior surface.
2. The contact lens of any preceding or following embodiment/feature/aspect, wherein the dimples have an average dimple diameter of from about 5 microns to about 60 microns, an average dimple pitch of from about 10 microns to about 150 microns, and said dimple coverage is from 5% to 80%, and said dimples are arranged such that no overall discernable geometric shape is created by the location of said dimples, and said contact lens has a post-blink movement on an eye that is no greater than that of a control that is the same except not having any dimples present, and said contact lens has the same oxygen transmission as said control.
3. The contact lens of any preceding or following embodiment/feature/aspect, wherein the dimples have an average dimple diameter of from about 20 microns to about 40 microns, an average dimple pitch of from about 30 microns to about 80 microns, and said dimple coverage is from 5% to 60%, and said dimples are arranged such that no overall discernable geometric shape is created by the location of said dimples, and said contact lens has the same post-blink movement on an eye compared to a control that is the same except not having any dimples present, and said contact lens has the same oxygen transmission as said control.
4. The contact lens of any preceding or following embodiment/feature/aspect, wherein said contact lens has an anterior surface with no dimples on the anterior surface.
5. The contact lens of any preceding or following embodiment/feature/aspect, wherein the dimples are not in contact with each other.
6. The contact lens of any preceding or following embodiment/feature/aspect, wherein the dimples each have a dimple diameter that is within 20% of said average dimple diameter.
7. The contact lens of any preceding or following embodiment/feature/aspect, wherein the dimples are a combination of more than one type of said dimples, each of said type having at least a different average dimple diameter.
8. The contact lens of any preceding or following embodiment/feature/aspect, wherein dimples are arranged such that no spoke pattern, no line pattern, and no ring pattern are present.
9. The contact lens of any preceding or following embodiment/feature/aspect, wherein the dimples have an average dimple depth of at least 5 microns.

10. The contact lens of any preceding or following embodiment/feature/aspect, wherein the dimples have an average dimple depth of at least 10 microns.
11. The contact lens of any preceding or following embodiment/feature/aspect, wherein the dimples have an average dimple depth of at least 15 microns.
12. The contact lens of any preceding or following embodiment/feature/aspect, wherein the dimples have an average dimple depth of from 15 microns to 40 microns.
13. The contact lens of any preceding or following embodiment/feature/aspect, wherein the dimples have a combination of more than one dimple depth.
14. The contact lens of any preceding or following embodiment/feature/aspect, wherein said dimples each have an average dimple depth to diameter ratio of at least 0.25.
15. The contact lens of any preceding or following embodiment/feature/aspect, wherein said number of dimples is from 5,000 to 1,000,000.
16. The contact lens of any preceding or following embodiment/feature/aspect, wherein said number of dimples is from 10,000 to 200,000.
17. The contact lens of any preceding or following embodiment/feature/aspect, wherein the dimples each have a smooth edge around the dimple openings to avoid sharp corners.
18. The contact lens of any preceding or following embodiment/feature/aspect, wherein the dimples are randomly, quasi-randomly, or uniformly dispersed in the peripheral zone.
19. The contact lens of any preceding or following embodiment/feature/aspect, wherein said dimples each have an average intra-dimple pitch to diameter ratio of at least 1.25.
20. The contact lens of any preceding or following embodiment/feature/aspect, wherein the dimples have a combination of more than one dimple pitch.
21. The contact lens of any preceding or following embodiment/feature/aspect, wherein said dimples each have a cross sectional side view that is circular, elliptical, triangular, rectangular, gaussian, or parabolic.
22. The contact lens of any preceding or following embodiment/feature/aspect, wherein said dimples each have a top view that is circular, elliptical, triangular, or rectangular.
23. The contact lens of any preceding or following embodiment/feature/aspect, wherein said contact lens is a soft contact lens.
24. The contact lens of any preceding or following embodiment/feature/aspect, wherein said contact lens is a silicone hydrogel contact lens.
25. The contact lens of any preceding or following embodiment/feature/aspect, wherein said dimples are located at least 0.05 mm away from said circumferential edge.
26. The contact lens of any preceding or following embodiment/feature/aspect, wherein said contact lens, as compared to a control lens, has a percentage of volume increase of at least 50%, wherein said control lens is a lens that has no dimples present in the lens, but is otherwise identical to said contact lens.
27. The contact lens of any preceding or following embodiment/feature/aspect, wherein said contact lens, as compared to a control lens, has a percentage of volume increase of at least 80%, wherein said control lens is a lens that has no dimples present in the lens, but is otherwise identical to said contact lens.
28. The contact lens of any preceding or following embodiment/feature/aspect, wherein said contact lens, as compared to a control lens, has a percentage of volume increase of from 5% to 200%, wherein said control lens is a lens that has no dimples present in the lens, but is otherwise identical to said contact lens.
29. The contact lens of any preceding or following embodiment/feature/aspect, wherein said contact lens has no dimples or a quasi-random distribution of said dimples located within 5 mm of a center of said contact lens.
30. The contact lens of any preceding or following embodiment/feature/aspect, wherein said contact lens has a quasi-random distribution of said dimples located within 5 mm of a center of said contact lens and said dimples located at least 5.5 mm from the center of said contact lens have a uniform distribution of said dimples.
31. The contact lens of any preceding or following embodiment/feature/aspect, wherein all of said dimples on said contact lens are located at least 4.5 mm from a center of said contact lens.
32. The present invention further relates to a mold for cast molding of a contact lens, said mold having a dome pattern, which is a negative pattern of a dimple pattern of dimples that is formed on a peripheral zone of a contact lens molded therein, said dimples numbering at least 1000 dimples, wherein the dimples provide a fill volume of at least 0.01 µl and have a dimple coverage of up to 80%.
33. The present invention further relates to an injection molding insert for forming a mold for cast molding of a contact lens, said injection molding insert having a dimple pattern of dimples that is formed on a peripheral zone of a cast molded contact lens, said dimples numbering at least 1000 dimples, wherein the dimples provide a fill volume of at least 0.01 µl and have a dimple coverage of up to 80%.
34. The present invention further relates to a method of administering a beneficial agent to an ocular surface of a subject, comprising placing the dimpled contact lens of any one of claims 1 through 25 on the cornea of the subject, wherein prior to placing the dimpled contact lens on the cornea either (a) the dimpled contact lens is removed from a contact lens packaging solution comprising the beneficial agent, or (b) an ophthalmic solution comprising the beneficial agent is applied to the posterior surface of the dimpled contact lens.

The present invention can include any combination of these various features or embodiments above and/or below as set forth in sentences and/or paragraphs. Any combination of disclosed features herein is considered part of the present invention and no limitation is intended with respect to combinable features.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

The entire contents of all cited references in this disclosure, to the extent that they are not inconsistent with the present disclosure, are incorporated herein by reference.

The present invention can include any combination of the various features or embodiments described above and/or in the claims below as set forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof

What is claimed is:

1. A contact lens comprising: a posterior surface having an optic zone, a peripheral zone, and a circumferential edge and said peripheral zone having dimples that number at least 1000 dimples, wherein the dimples provide a fill volume of at least 0.01 µl and have a dimple coverage of up to 80% based on a total surface area of said posterior surface.

2. The contact lens of claim 1, wherein the dimples have an average dimple diameter of from about 5 microns to about 60 microns, an average dimple pitch of from about 10 microns to about 150 microns, and said dimple coverage is from 5% to 80%, and said dimples are arranged such that no overall discernable geometric shape is created by the location of said dimples, and said contact lens has a post-blink movement on an eye that is no greater than that of a control that is the same except not having any dimples present, and said contact lens has the same oxygen transmission as said control.

3. The contact lens of claim 1, wherein the dimples have an average dimple diameter of from about 20 microns to about 40 microns, an average dimple pitch of from about 30 microns to about 80 microns, and said dimple coverage is from 5% to 60%, and said dimples are arranged such that no overall discernable geometric shape is created by the location of said dimples, and said contact lens has the same post-blink movement on an eye compared to a control that is the same except not having any dimples present, and said contact lens has the same oxygen transmission as said control.

4. The contact lens of claim 1, wherein said contact lens has an anterior surface with no dimples on the anterior surface.

5. The contact lens of claim 1, wherein the dimples are not in contact with each other.

6. The contact lens of claim 1, wherein the dimples each have a dimple diameter that is within 20% of said average dimple diameter.

7. The contact lens of claim 1, wherein the dimples are a combination of more than one type of said dimples, each of said type having at least a different average dimple diameter.

8. The contact lens of claim 1, wherein dimples are arranged such that no spoke pattern, no line pattern, and no ring pattern are present.

9. The contact lens of claim 1, wherein the dimples have an average dimple depth of at least 5 microns.

10. The contact lens of claim 1, wherein the dimples have an average dimple depth of at least 10 microns.

11. The contact lens of claim 1, wherein the dimples have an average dimple depth of at least 15 microns.

12. The contact lens of claim 1, wherein the dimples have an average dimple depth of from 15 microns to 40 microns.

13. The contact lens of claim 1, wherein the dimples have a combination of more than one dimple depth.

14. The contact lens of claim 1, wherein said dimples each have an average dimple depth to diameter ratio of at least 0.25.

15. The contact lens of claim 1, wherein said number of dimples is from 5,000 to 1,000,000.

16. The contact lens of claim 1, wherein said number of dimples is from 10,000 to 200,000.

17. The contact lens of claim 1, wherein the dimples each have a smooth edge around the dimple openings to avoid sharp corners.

18. The contact lens of claim 1, wherein the dimples are randomly, quasi-randomly, or uniformly dispersed in the peripheral zone.

19. The contact lens of claim 1, wherein said dimples each have an average intra-dimple pitch to diameter ratio of at least 1.25.

20. The contact lens of claim 1, wherein the dimples have a combination of more than one dimple pitch.

21. The contact lens of claim 1, wherein said dimples each have a cross sectional side view that is circular, elliptical, triangular, rectangular, gaussian, or parabolic.

22. The contact lens of claim 1, wherein said dimples each have a top view that is circular, elliptical, triangular, or rectangular.

23. The contact lens of claim 1, wherein said contact lens is a soft contact lens.

24. The contact lens of claim 1, wherein said contact lens is a silicone hydrogel contact lens.

25. The contact lens of claim 1, wherein said dimples are located at least 0.05 mm away from said circumferential edge.

26. The contact lens of claim 1, wherein said contact lens, as compared to a control lens, has a percentage of volume increase of at least 50%, wherein said control lens is a lens that has no dimples present in the lens, but is otherwise identical to said contact lens.

27. The contact lens of claim 1, wherein said contact lens, as compared to a control lens, has a percentage of volume increase of at least 80%, wherein said control lens is a lens that has no dimples present in the lens, but is otherwise identical to said contact lens.

28. The contact lens of claim 1, wherein said contact lens, as compared to a control lens, has a percentage of volume increase of from 5% to 200%, wherein said control lens is a lens that has no dimples present in the lens, but is otherwise identical to said contact lens.

29. The contact lens of claim 1, wherein said contact lens has no dimples or a quasi-random distribution of said dimples located within 5 mm of a center of said contact lens.

30. The contact lens of claim 1, wherein said contact lens has a quasi-random distribution of said dimples located within 5 mm of a center of said contact lens and said dimples located at least 5.5 mm from the center of said contact lens have a uniform distribution of said dimples.

31. The contact lens of claim 1, wherein all of said dimples on said contact lens are located at least 4.5 mm from a center of said contact lens.

32. A mold for cast molding of a contact lens, said mold having a dome pattern, which is a negative pattern of a dimple pattern of dimples that is formed on a peripheral zone of a contact lens molded therein, said dimples numbering at least 1000 dimples, wherein the dimples provide a fill volume of at least 0.01 µl and have a dimple coverage of up to 80%.

33. An injection molding insert for forming a mold for cast molding of a contact lens, said injection molding insert having a dimple pattern of dimples that is formed on a peripheral zone of a cast molded contact lens, said dimples numbering at least 1000 dimples, wherein the dimples provide a fill volume of at least 0.01 µl and have a dimple coverage of up to 80%.

34. A method of administering a beneficial agent to an ocular surface of a subject, comprising placing the dimpled contact lens of claim 1 on the cornea of the subject, wherein prior to placing the dimpled contact lens on the cornea either (a) the dimpled contact lens is removed from a contact lens packaging solution comprising the beneficial agent, or (b) an ophthalmic solution comprising the beneficial agent is applied to the posterior surface of the dimpled contact lens.

\* \* \* \* \*